(12) United States Patent
Bruinsma et al.

(10) Patent No.: US 6,435,659 B1
(45) Date of Patent: Aug. 20, 2002

(54) INKJET INKS WHICH IMPROVE DROP-VELOCITY STABILITY AND PROLONG RESISTOR LIFE IN INKJET PENS

(75) Inventors: Paul J. Bruinsma; Noah C. Lassar, both of San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 50 days.

(21) Appl. No.: 09/587,665

(22) Filed: Jun. 5, 2000

(51) Int. Cl.7 ............................ B41J 2/135; G01D 11/00
(52) U.S. Cl. ............................................. 347/45; 347/100
(58) Field of Search ........................ 106/31.95, 31.6, 106/31.27; 347/45, 62, 100

(56) References Cited

U.S. PATENT DOCUMENTS

| | | | | |
|---|---|---|---|---|
| 4,555,062 A | * | 11/1985 | You ........................... | 239/390 |
| 4,694,302 A | | 9/1987 | Hackleman et al. | |
| 5,198,023 A | | 3/1993 | Stoffel | |
| 5,340,388 A | * | 8/1994 | Breton et al. ............. | 106/31.32 |
| 5,380,358 A | | 1/1995 | Aoki et al. | |
| 5,792,249 A | * | 8/1998 | Shirota et al. ............ | 106/31.27 |
| 6,001,904 A | * | 12/1999 | Matzinger et al. ............. | 524/31 |
| 6,020,405 A | * | 2/2000 | Matzinger et al. ............. | 524/31 |
| 6,106,598 A | * | 8/2000 | Iijima ....................... | 106/31.27 |
| 6,204,307 B1 | * | 3/2001 | Miyabayashi ............... | 523/160 |

FOREIGN PATENT DOCUMENTS

| | | | | |
|---|---|---|---|---|
| JP | 56042684 | | 4/1981 | |
| JP | 359095157 | * | 6/1984 | ................. 347/63 |

* cited by examiner

*Primary Examiner*—John Barlow
*Assistant Examiner*—Michael S. Brooke
(74) *Attorney, Agent, or Firm*—W. Bradley Haymond

(57) ABSTRACT

An inkjet ink composition and a method of printing with the ink composition comprising at least one colorant and an aqueous vehicle comprising at least one metal salt or metal-organic complex that forms a film on the thermal inkjet resistor surface after repeated energizing of the resistor.

16 Claims, 3 Drawing Sheets

(3 of 3 Drawing Sheet(s) Filed in Color)

INKJET INKS WHICH IMPROVE DROP-VELOCITY STABILITY AND PROLONG RESISTOR LIFE IN INKJET PENS

FIELD OF INVENTION

The present invention relates to ink compositions suitable for thermal inkjet printing, and, more particularly, to ink compositions that are film forming and provide improved drop-velocity stability and prolonging resistor life in inkjet pens.

BACKGROUND OF INVENTION

The use of inkjet printing systems has grown dramatically in recent years. This growth may be attributed to substantial improvements in print resolution and overall print quality coupled with appreciable reduction in cost. Today's inkjet printers offer acceptable print quality for many commercial, business, and household applications at costs fully an order of magnitude lower than comparable products available just a few years ago. Notwithstanding their recent success, intensive research and development efforts continue toward improving inkjet print quality, while further lowering cost to the consumer.

An inkjet image is formed when a precise pattern of dots is ejected from a drop-generating device known as a "printhead" onto a printing medium. The typical inkjet printhead has an array of precisely formed nozzles located on a nozzle plate and attached to an inkjet printhead substrate. The substrate incorporates an array of firing chambers that receive liquid ink (colorants dissolved or dispersed in a solvent) through fluid communication with one or more ink reservoirs. Each chamber has a thin-film resistor, known as a "firing resistor," located opposite the nozzle so ink can collect between the firing resistor and the nozzle. In particular, each resistor element, which is typically a pad of a resistive material, measures about 35 $\mu m \times 35$ $\mu m$. The printhead is held and protected by an outer packaging referred to as a print cartridge, i e., inkjet pen.

Upon energizing of a particular resistor element, a droplet of ink is expelled through the nozzle toward the print medium, whether paper, transparent film or the like. The firing of ink droplets is typically under the control of a microprocessor, the signals of which are conveyed by electrical traces to the resistor elements, thereby forming alphanumeric and other characters on the print medium.

The small length scale of the nozzles, typically 10 to 40 $\mu m$ in diameter, require that the ink not clog the nozzles. Further, repeated firings of the resistor elements that must withstand many millions of firings over the life of the ink cartridge to be commercially practical, can result in fouling of the resistor elements and degrading pen performance. This build up of residue on the resistor elements is unique to thermal inkjet printers and is known as kogation and defined as the build-up of residue (koga) on the resistor surface.

Besides the problem of kogation, firing resistor surfaces are susceptible to passivation layer damage by cavitation, contamination and many other sources. Such passivation layer damage literally results in microscopic holes on the resistor surface which significantly shorten resistor life. Energizing of the firing resistor after hundreds of millions or even tens of billions of times can erode away the top passivation layer, which is typically tantalum. This erosion may be from a combination of oxidation, chemical attack by the ink at high temperatures, and cavitation.

Erosion of the top passivation layer can lead to the failure of the underlying electrically insulating layers, causing the circuit which provides power to the resistor to short out. If the electrically insulating layers are not compromised, erosion can degrade drop velocity stability by adversely affecting the heat conduction properties of the resistor.

Minimizing drop-velocity variations between nozzles and within nozzles is critical for accurate drop placement on paper. Drop placement errors degrade both text and image quality. The magnitudes of the placement errors caused by velocity variations are dependent on pen-to-paper spacing and pen scanning speed relative to the paper. Therefore, as thermal inkjet printers become faster and print on a greater variety of media, greater pen-to-paper distances will be needed and it will become more important to decrease drop velocity variations. Furthermore, drop placement errors are more noticeable with small drop-volume pens; the smaller drops cannot mask the errors.

Drop velocity variations are thought to be due to a combination of erratic drive bubble nucleation and variations in energies delivered to each resistor. The former may be more important for velocity variations within a given nozzle. The latter may be more important for velocity variations between nozzles and can be due to different resistances through the electrical traces between the power supply and each resistor. These parasitic resistances result in slightly different amounts of power being delivered to each resistor. Erratic drive-bubble nucleation can be due to surface roughness or pits on the resistor surface that provide low energy nucleation sites. Koga, a carbonaceous film formed from thermal decomposition of organic components in the ink, can especially contribute to surface roughness. Also, erratic bubble nucleation may be caused by sharp temperature gradients on the resistor surface that may cause nucleation to occur first over the center hot spot of the surface of resistor as opposed to a uniform nucleation over a greater fraction of the resistor surface area. The problem of sharp temperature gradients is worse in small drop volume pens. In addition, sharp temperature gradients can lead to local high temperatures on the resistor. Higher resistor temperatures worsen kogation build up. This rough carbonaceous deposit provides many nucleation sites, leading to early, erratic vapor-drive bubble formation, low drop velocity and drop weights.

Customer and profit demands require smaller drop volumes, color-laser-like ink permanence, and "permanent" print heads. Smaller drop volumes give better spatial and chroma resolutions. However, passivation layer damage appears to be worse in smaller drop volume pens. In small drop volume pens each resistor must fire a greater number of times to transfer the same amount of ink to the page. The greater number of firings required of the resistor results in more passivation layer damage.

Reducing passivation layer damage by increasing the passivation layer thickness is typically not practical in high throughput printers. Resistors with thicker passivation layers require more energy to eject an ink drop. However, most of this excess energy is retained as heat within the passivation layer and is not effectively transferred to the ink. Therefore the power requirements are greater and more expensive printer components may be needed. Furthermore, this retained heat can build up in the thermal inkjet pens that would cause the pens to overheat. Printing speeds would need to be reduced or elaborate cooling schemes employed to avoid the overheating.

The trend is towards longer print-head life, using pens with replaceable ink supplies such as (but not limited to) off-axis ink reservoirs that are connected to the pens by hoses and ink reservoirs that snap onto the print head. Infrequent need for replacement of the print heads with prolonged resistor life reduces the cost and servicing required of the customer. High-speed, high-throughput photocopier-like products that may be envisioned for the future will greatly increase ink usage and will most likely greatly push further the demands on print-head life. With higher pen-to-paper relative speeds, high-throughput products will be more sensitive to passivation layer damage induced drop velocity variations.

Even though some kogation and/or passivation layer damage control methods in inkjet ink pens are known, all of them are either limited in their effectiveness, are not economically feasible or have undesirable side effects for pens needing long resistor life. Thus, there is even more of a need to find a way to effectively deal with the problem of passivation layer damage on inkjet resistors.

Currently, tantalum is typically used as the material in the top coat film of the resistor. The metal is very hard and is resistant to cavitation damage. The metal has good chemical resistance. In spite of the beneficial properties of tantalum, the topcoat can erode after repeated firings many hundreds of millions or even tens of billions of times. In addition, defects in the tantalum can degrade the uniform nucleation properties of the surface and, as a consequence, diminish print and image quality.

What is needed is a way of renewing the surface on the top of the resistor during the repeated firings of the resistor. The renewal of the surface should be able to fill in pits and defects on the top coat and provide a more uniform nucleation surface with a more uniform temperature distribution during firing.

The film may not necessarily be hard if it can be renewed at a sufficient rate. An analogy can be made with erosion of the shoreline. The tantalum is like a granite cliff that eventually erodes from the action of the waves. The ceramic film of this invention is like a sand beach. Though the sand is easily moved and eroded by the waves, the beach will continue to exist as long as there is a sufficient supply of sand from the neighboring beach or from a nearby river. In the case of the thermal inkjet resistor, a continual supply of metal ions for the film formation comes from the ink itself.

Due to the added passivation of the renewable surface, the tantalum layer thickness can be thinned, minimizing the heat retained in the tantalum top coat. By providing a surface coating derived from the interaction of the ink with the resistor, it will be possible to substitute the tantalum top coat with a less durable material including silicon, silicon oxide, silicon nitride, and silicon carbide.

It has been previously disclosed that film formation may benefit resistor life. In the background of a patent on chelates for kogation control, Aoki and Koike disclose the possibility of beneficial film formation as disclosed in Japanese Patent Application Laid-open No. 56042684, with a substance used as a film-forming means in the ink to form a film on the surface of the heater. This surface film can relieve the shock to the surface that occurs at the time of generation and extinction of bubbles (cavitation). Substances that can be used as film-forming means can include metal-containing compounds such as organic metal chelate compounds, metals of an organic acid, metallized dyes and the like.

It has been previously disclosed that high amounts of aluminum salts can minimize black-to-color bleed and improve waterfastness. The addition of 1 to 10 wt % of aluminum chloride and other multivalent salts to cationic-dye inks was patented by Stoffel for black-to-color bleed control. Hackleman later patented a method for increasing waterfastness by reacting anionic dye with aluminum chloride either in the media or deposited on the media with a "fifth pen" with a 2 wt % aluminum chloride concentration.

At present, there is no patent literature concerning the addition of small amounts of aluminum salts to ink comprised of anionic dyes, especially aluminum salt additions that lead to film formation on the thermal inkjet resistor surface. Here "small amounts" is meant below 1000 parts-per-million (ppm). Furthermore there is no mention of ink-derived films improving thermal inkjet drop stability.

SUMMARY OF INVENTION

The present invention relates to a method of forming a metal oxide film on a surface of a thermal inkjet resistor to reduce kogation and prolong inkjet pen life comprising firing the resistor at least one time to inkjet print an image on a medium with inkjet ink, wherein the ink comprises:

at least one colorant; and an aqueous vehicle, the vehicle comprising aluminum ion in an amount sufficient, when the composition is used in an inkjet pen, to form a protective thin layer on an outer layer of a resistor surface of the inkjet pen, the outer layer comprising a refractory metal, a noble metal, a silicon composition or mixtures thereof, the refractory or noble metal being selected from the group consisting of titanium, zirconium, hafnium, vanadium, niobium, tantalum, chromium, molybdenum, tungsten, gold, silver, platinum, silica, silicon, silicon nitride, silicon carbide and mixtures thereof.

The present invention also relates to a thermal inkjet printhead comprising alumina-coated resistors.

Additionally, the present invention relates to a thermal inkjet ink comprising:

at least one colorant; and an aqueous vehicle, the vehicle comprising aluminum ion in an amount sufficient, when the composition is used in an inkjet pen, to form a protective thin layer on an outer layer of a resistor surface of the inkjet pen, the outer layer comprising a refractory metal, a noble metal, a silicon composition or mixtures thereof, the refractory or noble metal being selected from the group consisting of titanium, zirconium, hafnium, vanadium, niobium, tantalum, chromium, molybdenum, tungsten, gold, silver, platinum, silica, silicon, silicon nitride, silicon carbide and mixtures thereof.

Furthermore, the present invention relates to a method for inkjet printing, said method comprising the step of ejecting ink, said ink comprising: at least one colorant; and an aqueous vehicle, the vehicle comprising at least one refractory or noble metal-reactive component in an amount sufficient, when the composition is used in an inkjet pen, to form a protective thin layer on an outer layer of a resistor surface of the inkjet pen, the outer layer comprising a refractory metal, a noble metal, a silicon composition or mixtures thereof, the refractory or noble metal being selected from the group consisting of titanium, zirconium, hafnium, vanadium, niobium, tantalum, chromium, molybdenum, tungsten, gold, silver, platinum, silica, silicon, silicon nitride, silicon carbide and mixtures thereof.

BRIEF DESCRIPTION OF DRAWINGS

The file of this patent contains at least one drawing executed in color. Copies of this patent with color drawing(s) will be provided by the Patent and Trademark Office upon request and payment of the necessary fee.

DETAILED DESCRIPTION OF INVENTION

Figure 1:
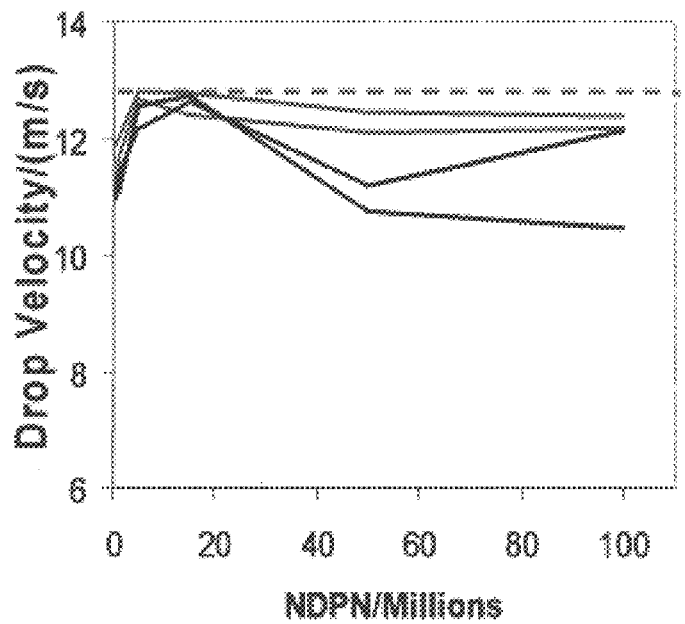
FIG. 1 is the average drop velocity for a thermal inkjet pen plotting the effect of increasing the number of resistor firings for an ink containing aluminum nitrate and an ink containing sodium nitrate as a control.

The invention described herein is directed to inkjet inks for printing inkjet images using commercially available inkjet printers such as, for example but not limited to, HP DeskJet® printers, manufactured by Hewlett-Packard Company, of Palo Alto, Calif. The inks enable production of near photographic images having little or no coalescence, excellent waterfastness, and reduced dry time, on a range of print media, in particular, for example but not limited to, plain white, 8½"×11", 20 lb. weight, printer paper conventionally used for office and home computers.

As stated above in the background, something is needed to improve drop velocity stability of inkjet resistors and something to provide a renewable resistor surface. Applicants have found that aluminum salts in inkjet inks create a beneficial film on the tantalum layer of the inkjet resistor.

Addition of aluminum nitrate to thermal inkjet ink at a level of at least 50 ppm was found to unexpectedly improve pen performance. Relative to the control ink without aluminum addition, the average drop velocities are stabilized and the pooled standard deviations in the drop velocity are reduced. These effects occurred early in the pen life at around 5 million drops. The drop velocity changes with resistor "firings" up to the first 5 million drops per nozzle are believed to be associated with burn-off of organic materials associated with pen manufacture rather than a build up of the effect of the aluminum salt. This burn-off effectively cleans the resistor surface.

Aluminum salt solutions must be carefully combined with thermal inkjet inks to avoid local supersaturation of the aluminum ions that may lead to precipitation of the aluminum. Not allowing enough time for the aluminum to mix and dissolve in the ink can lead to particulate build-up and clogging in the orifices in the thermal inkjet pen. Additions of aluminum nitrate to ink vehicle without mixing forms a gel-like precipitate. When the ink vehicle was mixed well during drop-wise addition of the aluminum nitrate, no precipitate formed. It has been found that precipitation can be avoided by: (1) aging the inks to allow re-dissolution (2) insuring better mixing during aluminum nitrate solution addition or (3) using lower salt solution concentrations. The avoidance of precipitation is an important manufacturing consideration. For example, addition of a strong base to raise the pH of a bulk ink containing aluminum salt may lead to local precipitation of aluminum hydroxide that would be slow to re-dissolve and could settle on the bottom of a storage tank.

In inkjet inks containing phosphate ions or phosphate esters, aluminum addition can cause kogation and, even worse, cause drop velocity instability. Thermal inkjet inks containing phosphate or phosphate esters are incompatible with the aluminum additions that are part of this invention.

Though it is difficult to determine the exact mechanism, speculation can be made on why the addition of the aluminum nitrate salt to the thermal inkjet ink improves drop velocity uniformity and also reduces formation of carbonaceous koga.

The koga formed by the aluminum may have a role in evening out resistor variations in a feedback mechanism that may offset over-energy. Over-energy, the energy in excess of that needed to fire a drop, can be an important contributor to kogation. Controlling over-energy to a minimum can be a strategy for reducing or eliminating kogation. Generally, however, some over-energy is required to compensate for resistor-to-resistor variations and pen-to-pen variations. Most resistors are given more energy than necessary to assure that every resistor has the minimum required energy.

With resistor firing of aluminum-spiked ink, two effects occur. Initially the organic residue from the manufacturing process burns away and the aluminum salt forms a film. The boiling of the solvent leaves an alumina behind as a precipitate. Where the resistor is hotter, the film forms more quickly and provides a thermal-insulating layer, reducing heat transfer from the hot spots. By reducing maximum temperatures on the surface of the resistors, kogation is reduced or eliminated.

The film formation by the thermal process gives a negative feedback "control" that evens out spatial variations on a given resistor and between resistors. In a sense the aluminum salt leads to the formation of beneficial film that does not lead to prenucleation or erratic drop ejection. The mechanism may involve beneficial film properties including achieving low surface energy (better nucleation) and a smooth, cavitation-resistant surface.

Because the benefit of aluminum nitrate reducing drop velocity variation occurs very early, at around 5 million drops per nozzle, alumina precipitate can provide a better nucleation surface than the unconditioned tantalum by initially filling in defects on the tantalum surface that could cause erratic nucleation.

Generally, the present invention relates to an inkjet ink composition that is film forming by repeated energizing of the resistor. This film is beneficial for improving drop velocity stability and can prolong resistor life because the film can be continually refreshed during repeated energizing of the resistor.

In one embodiment, the present invention relates to a method of forming a metal oxide film on a surface of a thermal inkjet resistor to reduce kogation and prolong inkjet pen life comprising firing the resistor at least one time to inkjet print an image on a medium with inkjet ink, wherein the ink comprises: at least one colorant; and an aqueous vehicle, the vehicle comprising aluminum ion in an amount sufficient, when the composition is used in an inkjet pen, to form a protective thin layer on an outer layer of a resistor surface of the inkjet pen, the outer layer comprising a refractory metal, a noble metal, a silicon composition or mixtures thereof.

In another embodiment, the present invention relates to a thermal inkjet printhead comprising alumina-coated resistors. In a more preferred embodiment, the thermal inkjet printhead is a small volume thermal inkjet printhead. In another more preferred embodiment, the thermal inkjet printhead is an extended life thermal inkjet printhead.

In yet another more preferred embodiment of the thermal inkjet printhead, the alumina-coated resistors are coated by a method comprising firing the resistor at least one time to inkjet print an image on a medium with inkjet ink, wherein the ink comprises: at least one colorant; and an aqueous vehicle, the vehicle comprising aluminum ion in an amount sufficient, when the ink is used in an inkjet pen, to form a protective thin layer on an outer layer of a resistor surface of the inkjet pen, the outer layer comprising a refractory metal, a noble metal, a silicon composition or mixtures thereof.

In another embodiment, the present invention relates to a thermal inkjet ink comprising: at least one colorant; and an aqueous vehicle, the vehicle comprising aluminum ion in an amount sufficient, when the ink is used in an inkjet pen, to form a protective thin layer on an outer layer of a resistor surface of the inkjet pen, the outer layer comprising a refractory metal, a noble metal, a silicon composition or mixtures thereof.

Additionally, the present invention relates to a method for inkjet printing, said method comprising the step of ejecting ink, said ink comprising: at least one colorant; and an aqueous vehicle, the vehicle comprising aluminum ion in an amount sufficient, when the ink is used in an inkjet pen, to form a protective thin layer on an outer layer of a resistor surface of the inkjet pen, the outer layer comprising a refractory metal, a noble metal, a silicon composition or mixtures thereof.

In a more preferred embodiment of the above-described embodiments, the refractory metal, the noble metal, the silicon composition or mixtures thereof are selected from the group consisting of titanium, zirconium, hafnium, vanadium, niobium, tantalum, chromium, molybdenum, tungsten, gold, silver, platinum, silica, silicon, silicon nitride, silicon carbide and mixtures thereof.

In another more preferred embodiment of the above-described embodiments, the ink has an aluminum ion concentration range from 10 to 500 ppm. In a yet more preferred embodiment, the ink has an aluminum ion concentration range from 40 to 70 ppm.

In another more preferred embodiment of the above-described embodiments, the aluminum ions in the ink are obtained in the ink before the ink is inkjet printed by the step of adding aluminum to the ink, the aluminum being added to the ink in a form selected from aluminum salts, aluminum organic chelates and aluminum metal.

In yet another more preferred embodiment of the above-described embodiments, the aluminum coating on the thermal inkjet resistor surface is in a form selected from aluminum-oxyhydroxide, aluminum-hydroxide and aluminum-oxide.

In still another more preferred embodiment of the above-described embodiments, the ink has a pH range from 3.5 to 5.5.

In another more preferred embodiment of the above-described embodiments, the outer layer of the resistor surface comprises tantalum.

In yet another more preferred embodiment of the above-described embodiments, the inkjet pen has a minimum drop volume range of from 1 to 10 picoliters. In a still more preferred embodiment, the inkjet pen has a minimum drop volume range of from 3 to 6 picoliters.

In still another more preferred embodiment of the above-described embodiments, the inkjet pen can be fired at least 50 million times without being replaced. In a still more preferred embodiment, the inkjet pen can be fired at least 100 million times without being replaced.

In yet another more preferred embodiment of the above-described embodiments, the ink in the inkjet pen is replaceable.

In another more preferred embodiment of the above-described embodiments, the at least one colorant is selected from a group consisting of a dye and a pigment.

Surfactant

Surfactants suitably employed in the practice of the invention include anionic and nonionic surfactants. Examples of anionic surfactants include: Sulfonate surfactants such as Sulfosuccinates (Aerosol OT, A196; AY and GP, available from CYTEC) and Sulfonates (Aerosol DPOS-45, OS available from CYTEC; a Witconate C-50H available from WITCO; Dowfax 8390 available from DOW); and Fluoro surfactants (Fluorad FC99C available from 3M). Examples of nonionic surfactants include: Fluoro surfactants (Fluorad FC170C available from 3M); Alkoxylate surfactants (Tergitol series 15S-5, 15S-7, and 15S-9 available from Union Carbide); and Organosilicone surfactants (Silwet L-77 and L-76-9 available from WITCO). These surfactants provide the necessary dot spread on plain paper and special media, such as photobase glossy paper, for providing excellent image quality.

Colorants

The inks made according to the present invention comprise at least one colorant, preferably at least one dye. The amount of dye added to the vehicle in prior compositions and the inventive compositions tend to be a function of choice, and is largely dependent upon solubility of the dye in the vehicle and the color intensity of the dye. Typical amounts of dye are between about 0.1 wt % to about 10 wt % of ink composition, preferably, between about 0.1 and 5 wt %. In compositions of the invention, the dye is preferably colored rather than black, although any of the dyes used in inks for in-jet printers may be employed. Illustrative suitable dyes include Direct Blue 199 (available from Avecia as Projet Cyan Special), Acid Blue 9; Direct Red 9, Direct Red 227, Magenta 377 (available from Ilford AG, Rue de l'Iandustrie, CH-1700 Fribourg, Switzerland), Acid Yellow 23, Direct Yellow 132, Direct Yellow 86, Yellow 104 (Ilford AG), Direct Yellow 4 (BASF), Yellow PJY H-3RNA (Avecia), and Direct Yellow 50 (Avecia). More preferably, Direct Blue 199, Magenta 377, and Ilford Yellow 104 are employed as the cyan, magenta, and the yellow colorants. Although in a preferred embodiment, the invention is directed to dye-based ink, addition of surface active phosphate esters would also provide benefit to pigment-based ink.

Other Ingredients

The inks of the present invention may optionally comprise components such as buffers, metal chelators, and biocides, as are well known in the art of inkjet ink formulation.

Buffer

Buffers optionally employed in the practice of the invention to modulate pH can be organic-based biological buffers or inorganic buffers, preferably, organic-based. Further, the buffers employed should provide a pH ranging from about 3 to about 9 in the practice of the invention, preferably about 4 to about 6 and most preferably from about 4 to about 5. Examples of preferably-employed buffers include succinic acid, tris(hydroxymethyl)aminomethane, available from companies such as Aldrich Chemical (Milwaukee, Wis.), 4-morpholineethanesulfonic acid (MES), and 4-morpholinepropanesulfonic acid (MOPS). Most preferably, succinic acid is employed in the practice of the invention.

The inks of the present invention optionally comprise 0 to about 1.5 wt % buffer. More preferably, the inks comprise from about 0.1 to about 0.5 wt % buffer, with a concentration from about 0.1 to about 0.3 wt % being the most preferred.

Biocide

Any of the biocides commonly employed in inkjet inks may optionally be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide.

INDUSTRIAL APPLICABILITY

The ink formulations are expected to find use in thermal inkjet printing applications to increase dot gain while maintaining excellent color-to-color bleed alleviation, particularly when using photobase glossy paper.

EXAMPLES

Example 1

Ink was prepared according to Table 1.

TABLE 1

| M377 Ilford dye | Absorbance of 0.10 at 1:10000 dilution |
| --- | --- |
| Pro-jet 289 | Absorbance of 0.12 at 1:10000 dilution |
| 2-pyrrolidinone | 8 wt % |
| 1,5-pentanediol | 8.8 |
| EHPD | 1.9 |
| Dowfax 8390 | 1 |
| Succinic acid | 1.8 |
| Tergitol 15-s-5 | 1. |
| Tergitol 15-s-7. | 0.6 |

The pH of the ink was adjusted to 4 using a solution of sodium hydroxide. To one portion of the ink, aluminum nitrate was added as a 10% aqueous metal salt solution to give an aluminum ion concentration of 50 ppm. To a second portion of the ink, the control ink, an equivalent molar amount of sodium nitrate was added. These two portions of ink were used to fill thermal inkjet pens. Different sets of resistors on the pen were fired 0, 0.5, 1, 5, 15, 50 and 100 million times per resistor. Following the firings, drop velocities were measured to determine the average drop velocity and drop velocity variation for each nozzle.

Figure 2:
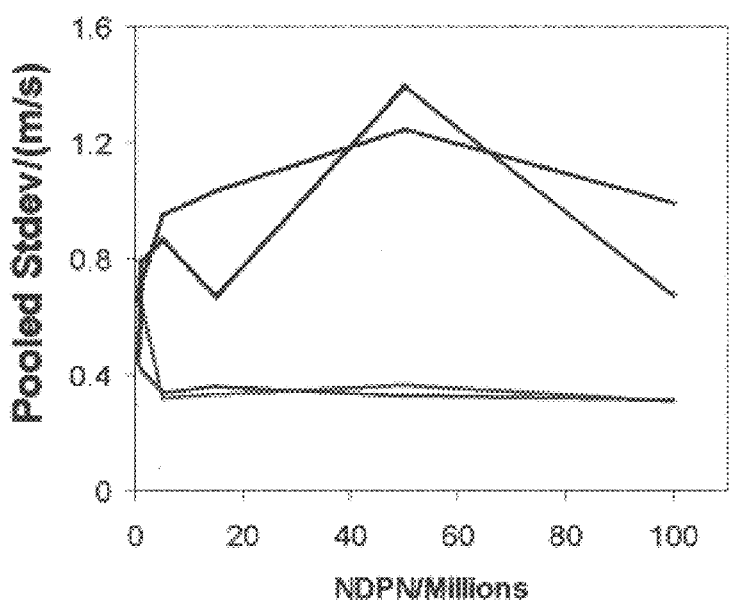
FIG. 2 is the pooled drop velocity variation within the nozzles for a thermal inkjet pen plotting the effect of increasing the number of resistor firings for an ink containing aluminum nitrate and an ink containing sodium nitrate as a control.

The average drop velocity and pooled velocity standard deviations for a thermal inkjet pen plotting the effect of increasing number of resistor firings are shown in FIGS. 1 and 2, respectively, for an ink comprising aluminum nitrate and an ink containing sodium nitrate as a control. As can be seen, the drop velocity stability is much better for the thermal inkjet pens with inkjet ink comprising aluminum nitrate salt. The velocity is much more constant over the range of firings and the drop velocity variation is much less than for the pens containing the control ink with sodium nitrate.

Figure 3:
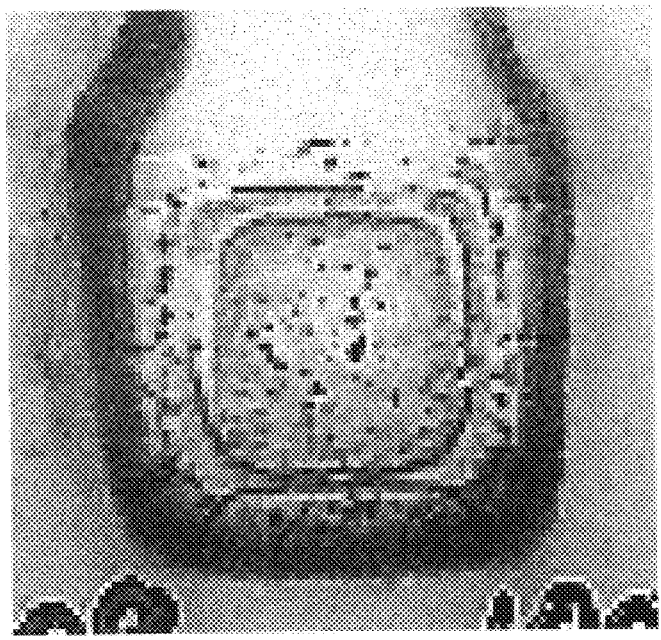
FIG. 3 is a photograph of a resistor of an inkjet pen fired up to 100 million drops with an inkjet ink containing 50 ppm aluminum ions.
Figure 4:
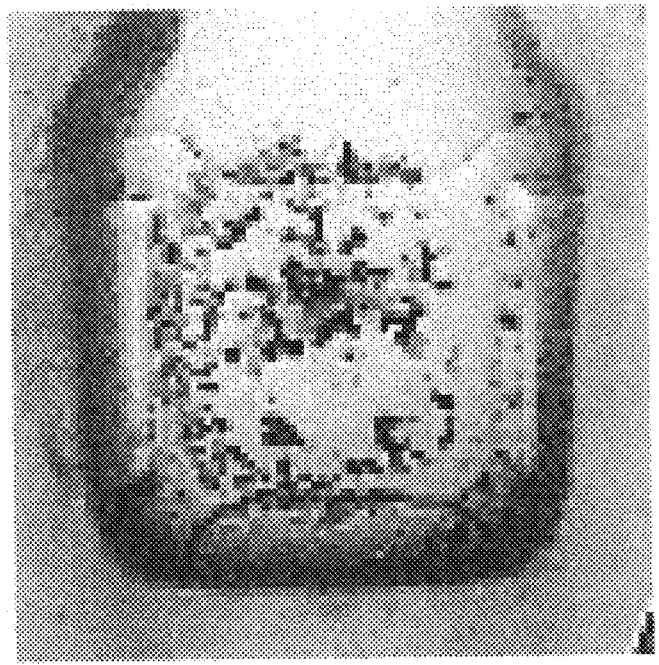
FIG. 4 is a photograph of a resistor of an inkjet pen fired up to 100 million drops with an inkjet ink containing sodium nitrate in a molar amount equivalent to 50 ppm aluminum.
Figures 5, 6, 7, 8, 9, 10:
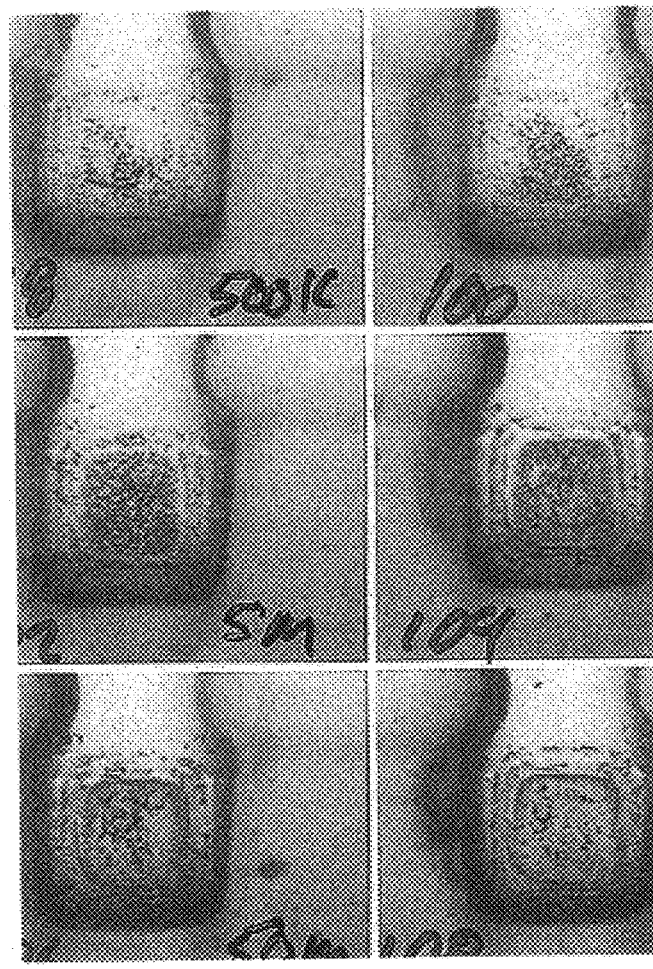
FIG. 5 is a photograph of a resistor of an inkjet pen fired up to 500 thousand drops with an inkjet ink containing 50 ppm aluminum ions.
FIG. 6 is a photograph of a resistor of an inkjet pen fired up to 1 million drops with an inkjet ink containing 50 ppm aluminum ions.
FIG. 7 is a photograph of a resistor of an inkjet pen fired up to 5 million drops with an inkjet ink containing 50 ppm aluminum ions.
FIG. 8 is a photograph of a resistor of an inkjet pen fired up to 15 million drops with an inkjet ink containing 50 ppm aluminum ions.
FIG. 9 is a photograph of a resistor of an inkjet pen fired up to 50 million drops with an inkjet ink containing 50 ppm aluminum ions.
FIG. 10 is a photograph of a resistor of an inkjet pen fired up to 100 million drops with an inkjet ink containing 50 ppm aluminum ions.

Photographs of the resistor surfaces after firing 100 million drops are shown in FIGS. 3 and 4 for thermal inkjet pens with inkjet ink with the aluminum nitrate and the control ink, respectively. The aluminum addition leads to the formation of a film on the resistor surface that progressively increases with the number of firings. Through surface analysis the film is found to be composed principally of aluminum and oxygen heteroatoms and may be an aluminum oxide, aluminum oxyhydroxide or aluminum hydroxide phase. Little carbonaceous material is found in the film. The film thickness is greater at center of the resistor where the surface has the highest temperatures and is thinner near the perimeter of the resistor.

Photographs of the resistor surfaces of thermal inkjet pens using inkjet ink with the aluminum nitrate after firing 500 thousand drops, 1 million drops, 5 million drops, 15 million drops, 50 million drops and 100 million drops per nozzle are shown in FIGS. 5, 6, 7, 8, 9 and 10 respectively.

Example 2

Organic acids are useful in thermal inkjet inks as buffers that help stabilize the pH value of the ink. However, the type and concentration of organic acid can affect whether an ink is film forming.

Ink was prepared according to Table 2.

TABLE 2

| M377 Ilford dye | Absorbance of 0.10 at 1:10000 dilution |
| --- | --- |
| Pro-jet 289 | Absorbance of 0.12 at 1:10000 dilution |
| 2-pyrrolidinone | 8.75 wt % |
| 1,5-pentandediol | 8. |
| EHPD | 1.9 |
| Dowfax 8390 | 1 |
| Tergitol 15-s-5 | 1. |
| Tergitol 15-s-7. | 0.6 |

From this solution separate ink samples were prepared with the following types and amounts of organic acids.

Ink was prepared according to Table 3.

TABLE 3

| 2-1 | Malonic acid | 1.61 wt % |
| --- | --- | --- |
| 2-2 | Succinic acid | 1.83 |
| 2-3 | Glutaric acid | 2.05 |
| 2-4 | Adipic acid | 2.28 |
| 2-5 | Glycolic acid | 1.17 |
| 2-6 | 2,2-Bis(hydroxymethyl)propanoic acid | 2.09 |

The solutions above have different types of organic acids but have approximately equal molar concentrations. The pH of the ink was adjusted to 4 using a solution of sodium hydroxide. A 13.90% aqueous solution of aluminum nitrate nonahydrate was added to each solution dropwise under stirring to yield 50 ppm Al in each solution. Solutions were aged at 60 C. for 24 h. Thermal inkjet pens were filled with the inks and fired up to 100 million times per resistor. Resistors were examined after firing for film formation. Results are summarized in Table 4 for different organic acids. As can be seen organic acids with hydroxyl groups in an alpha position do not lead to film formation for the formulations of this example. The alpha hydroxyl in combination with the carboxylate group can act to chelate the aluminum ions and prevent their deposition as a film. In addition inks comprising malonic acid, a short-length di-acid, and 2,2-bis(hydroxymethyl)propanoic acid did not lead to film formation.

TABLE 4

| | | |
|---|---|---|
| 2-1 | Malonic acid | No film formation |
| 2-2 | Succinic acid | Film formation |
| 2-3 | Glutaric acid | Film formation |
| 2-4 | Adipic acid | Film formation |
| 2-5 | Glycolic acid | No film formation |
| 2-6 | 2,2-Bis(hydroxymethyl)propanoic acid | No film formation |

Example 3

The inventors investigated how sensitive the film formation is to the vehicle composition by varying the concentration of 2-pyrrolidinone in the inks. Ink was prepared according to Table 5.

TABLE 5

| | |
|---|---|
| M377 Ilford dye Absorbance of 0.10 at 1:10000 dilution | |
| Pro-jet 289 | Absorbance of 0.12 at 1:10000 dilution |
| 2-pyrrolidinone | 0, 1.3, 2.6, 3.9, 5.2, 6.5, 7.8 and 9.0 wt % |
| 1,5-pentandediol | 8 |
| EHPD | 1.9 |
| Dowfax 8390 | 1 |
| Succinic acid | 1.8 |
| Tergitol 15-s-7. | 1.5 |

The pH of the inks was adjusted to 4 using a solution of sodium hydroxide. A 13.90% aqueous solution of aluminum nitrate nonahydrate was added to each solution dropwise under stirring to yield 50 ppm Al in each solution. Solutions were aged at 60 C. for 24 h. Thermal inkjet pens were filled with the inks and fired up to 100 million times per resistor. Resistors were examined after firing for film formation. Films formed for all of the concentration of 2-pyrrolidinone investigated including from the ink without 2-pyrrolidinone.

Example 4

Organic acids are useful in thermal inkjet inks as buffers that help stabilize the pH value of the ink. However, the concentration of organic acid can affect whether an ink is film forming.

Ink was prepared according to Table 2 with the following amounts of succinic acid: 0.5, 0.6, 0.7, 0.9, 1.1, 1.3, 1.6, 1.9, 2.3, 2.7, 3.3 and 4.0%. The pH's of the inks were adjusted to 4 using a solution of sodium hydroxide. A 13.90% aqueous solution of aluminum nitrate nonahydrate was added to each solution dropwise under stirring to yield 50 ppm Al in each solution. Solutions were aged at 60 C. for 24 h. Thermal inkjet pens were filled with the inks and fired up to 100 million times per resistor. Resistors were examined after firing for film formation. Films formed for inks with succinic acid concentrations from 0.5 up to 2.3% and did not form for the inks with succinic acid concentrations of 2.7% or greater.

What is claimed is:

1. A thermal ink jet printhead comprising alumina-coated resistors wherein the alumina-coated resistors are coated by a method comprising firing the resistor at least one time to inkjet print an image on a medium with inkjet ink, wherein the ink comprises:
   at least one colorant; and
   an aqueous vehicle, the vehicle comprising
      aluminum ion in an amount sufficient, when the ink is used in an inkjet pen, to form a protective thin layer on an outer layer of a resistor surface of the inkjet pen, the outer layer comprising a refractory metal, a noble metal, a silicon composition or mixtures thereof.

2. The thermal inkjet printhead of claim 1, wherein the refractory metal, the noble metal, the silicon composition or mixtures thereof are selected from the group consisting of titanium, zirconium, hafnium, vanadium, niobium, tantalum, chromium, molybdenum, tungsten, gold, silver, platinum, silica, silicon, silicon nitride, silicon carbide and mixtures thereof.

3. The thermal inkjet printhead of claim 2, wherein the ink has a pH range from 3.5 to 5.5.

4. The thermal inkjet printhead of claim 2, wherein the outer layer comprises tantalum.

5. The thermal inkjet printhead of claim 2, wherein the inkjet pen has a minimum drop volume range of from 1 to 10 picoliters.

6. The thermal inkjet printhead of claim 5, wherein the inkjet pen has a minimum drop volume range of from 3 to 6 picoliters.

7. The thermal inkjet printhead of claim 2, wherein the inkjet pen can be fired at least 50 million times without being replaced.

8. The thermal inkjet printhead of claim 7, wherein the inkjet pen can be fired at least 100 million times without being replaced.

9. The thermal inkjet printhead of claim 2, wherein ink in the inkjet pen is replaceable.

10. The thermal inkjet printhead of claim 2, wherein the at least one colorant is selected from a group consisting of a dye and a pigment.

11. The thermal inkjet printhead of claim 7, wherein the ink has an aluminum ion concentration range from 10 to 500 ppm.

12. The thermal inkjet printhead of claim 11, wherein the ink has an aluminum ion concentration range from 40 to 70 ppm.

13. The thermal inkjet printhead of claim 7, wherein the aluminum ions in the ink are obtained in the ink before the ink is inkjet printed by the step of adding aluminum to the ink, the aluminum being added to the ink in a form selected from aluminum salts, aluminum organic chelates and aluminum metal.

14. The thermal inkjet printhead of claim 2, wherein the aluminum coating on the thermal inkjet resistor surface is in a form selected from aluminum-oxyhydroxide, aluminum-hydroxide and aluminum-oxide.

15. The thermal inkjet printhead of claim 1, wherein the printhead is a small volume thermal inkjet printhead.

16. The thermal inkjet printhead of claim 1, wherein the printhead is an extended life thermal inkjet printhead.

* * * * *